US007680617B2

(12) United States Patent
Mazrooee et al.

(10) Patent No.: US 7,680,617 B2
(45) Date of Patent: Mar. 16, 2010

(54) PROCESS CONTROL ARCHITECTURE WITH HYDRODYNAMIC CORRECTION

(75) Inventors: Mehdi Mazrooee, Duncan, OK (US); Jason D. Dykstra, Addison, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 697 days.

(21) Appl. No.: 11/545,751

(22) Filed: Oct. 10, 2006

(65) Prior Publication Data

US 2008/0084783 A1 Apr. 10, 2008

(51) Int. Cl.
*G01F 25/00* (2006.01)

(52) U.S. Cl. ....................................... 702/100; 700/282

(58) Field of Classification Search ................. 702/100, 702/182–185, 188; 700/282
See application file for complete search history.

(56) References Cited

U.S. PATENT DOCUMENTS 5,315,530 A * 5/1994 Gerhardt et al. ............. 700/282
2006/0112701 A1 6/2006 Dykstra
2006/0118170 A1 6/2006 Dykstra
2006/0161358 A1 7/2006 Dykstra et al.
2006/0176640 A1 8/2006 Dykstra
2006/0177203 A1 8/2006 Dykstra

OTHER PUBLICATIONS

U.S. Appl. No. 11/121,144, unpublished, Dykstra, et al.
U.S. Appl. No. 11/121,278, unpublished, Dykstra, et al.
U.S. Appl. No. 11/323,322, unpublished, Dykstra, et al.
U.S. Appl. No. 11/323,323, unpublished, Dykstra, et al.
U.S. Appl. No. 11/323,324, unpublished, Dykstra, et al.
U.S. Appl. No. 11/121,325, unpublished, Dykstra, et al.
U.S. Appl. No. 11/323,831, unpublished, Dykstra, et al.

* cited by examiner

*Primary Examiner*—Edward Raymond
(74) *Attorney, Agent, or Firm*—John W. Wustenberg; Groover & Associates

(57) ABSTRACT

Methods and systems for controlling processes related to the amount of fluid in a container subjected to externally-excited motions. Fluid level sensor measurements in processing tanks on-board boats are confused by ocean waves and swells. A hydrodynamic model of a fluid in a tank can be constructed using non-linear dynamic model algorithms with inputs such as multi-axis accelerations, fluid viscosity, and apparent level measurements. The model can be used to filter-out boat motion disturbances to obtain a corrected level of the fluid in the tank. The corrected fluid level signal can be further processed using a dynamic model of the tank and associated input and output flow rates in a closed loop observer. The methods and systems are especially advantageous for off-shore equipment such as cementing and fracturing ships.

24 Claims, 6 Drawing Sheets

300 Cement Blender Process
304 Water Control Valve
305 Cement In
306 Dry Cement Flow Control Device
308 Accelerant Flow Control Device
302 Water In
307 Accelerant In
301 Blender
311 Fluid Level
310 Fluid Level Sensor
315 Pump Flow Control
313 Viscosity Sensor
312 Mixed Cement Out
314 Cement Pump to Down-Hole
316 Process Control Unit
318 External System

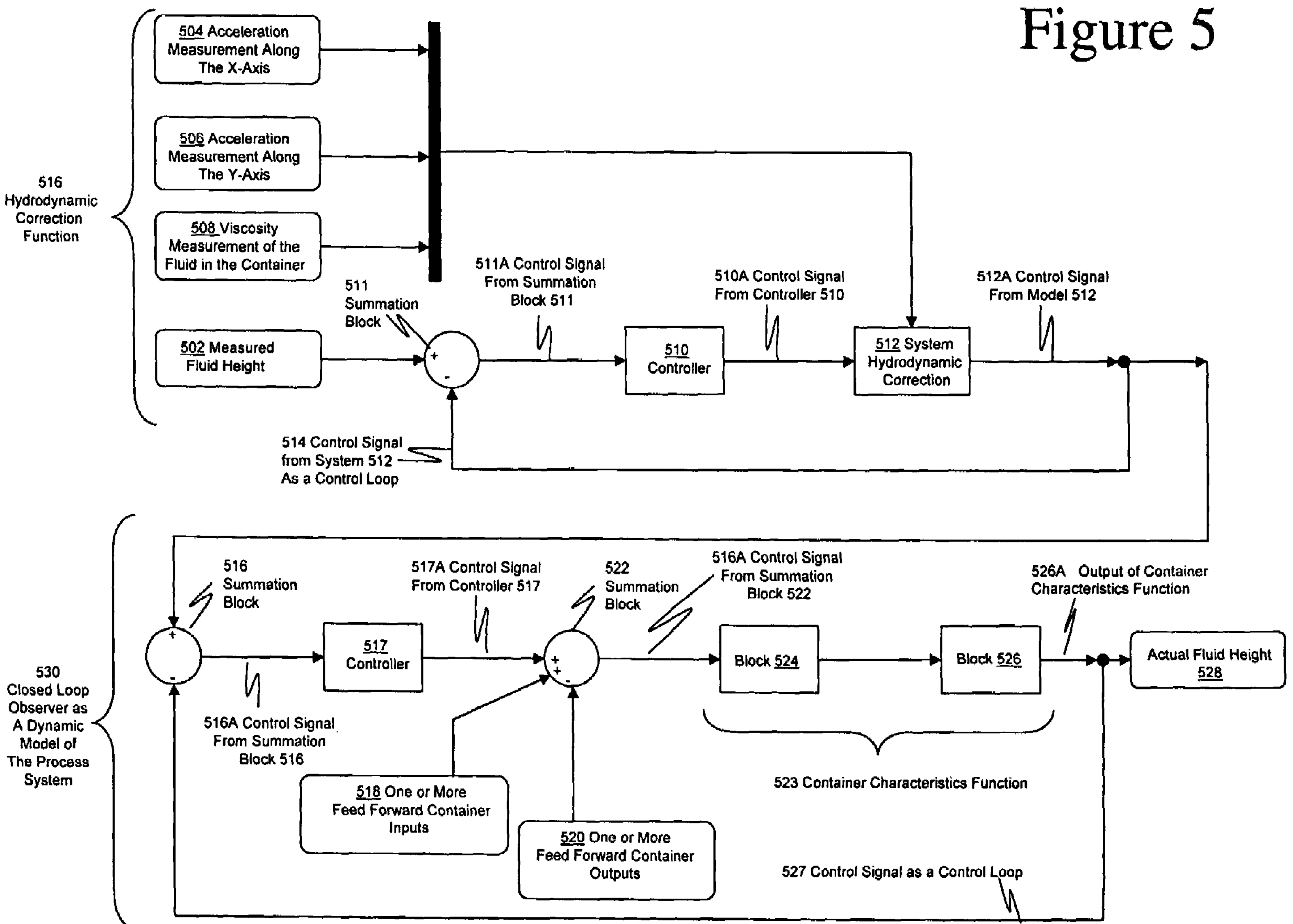
Figure 5
516 Hydrodynamic Correction Function
504 Acceleration Measurement Along The X-Axis
506 Acceleration Measurement Along The Y-Axis
508 Viscosity Measurement of the Fluid in the Container
502 Measured Fluid Height
511 Summation Block
511A Control Signal From Summation Block 511
510 Controller
510A Control Signal From Controller 510
512 System Hydrodynamic Correction
512A Control Signal From Model 512
514 Control Signal from System 512 As a Control Loop
530 Closed Loop Observer as A Dynamic Model of The Process System
516 Summation Block
516A Control Signal From Summation Block 516
517 Controller
517A Control Signal From Controller 517
522 Summation Block
516A Control Signal From Summation Block 522
518 One or More Feed Forward Container Inputs
520 One or More Feed Forward Container Outputs
Block 524
Block 526
523 Container Characteristics Function
526A Output of Container Characteristics Function
Actual Fluid Height 528
527 Control Signal as a Control Loop

PROCESS CONTROL ARCHITECTURE WITH HYDRODYNAMIC CORRECTION

BACKGROUND AND SUMMARY OF THE INVENTION

The present application relates to systems and methods for process control, and more particularly to control of processes related to the amount of fluid in a container subject to externally-excited motions, and most especially to control of processes such as storing and blending of fluids and solids when such processes are conducted aboard a waterborne apparatus.

The following paragraphs contain some discussion, which is illuminated by the innovations disclosed in this Application, and any discussion of actual or proposed or possible approaches in these paragraphs does not imply that those approaches are prior art.

Background: Process Control of Fluid Level

Modern hydrocarbon production and processing systems use automated equipment in many aspects of their operations. A key element of such automated operations is the process control system. Such control systems usually include sensors, which in one important function, send a signal back to a process control unit. The signal is usually a communication of a process variable or condition, such as temperature, pressure, fluid or solid flow rate, or fluid level in a container. The process control unit can perform such functions as monitoring the system or unit operations or process variables, making process decisions, energizing and de-energizing equipment, collecting and maintaining data, providing stability to the overall system, and, very importantly, ensuring the system and the unit operations comprising the system operate within desired parameters.

Sensors are often placed at specific locations within a production or processing system to provide information necessary for the control of various unit operations. The role of the sensor includes providing accurate and real-time information about a particular process variable or set of variables such that the process control unit can make decisions based on good and accurate information.

As an example of the needs and challenges in the accurate sensing and control of processes in the production of hydrocarbons, consider the process of "completing" an off-shore hydrocarbon well-bore. Such work is usually managed and done aboard "service ships," including the cementing of the well-bore.

After drilling of an oil or gas well-bore is finished, the well-bore is "cemented" under carefully-controlled conditions. The first step is to run a steel casing into the well-bore, followed by pumping cement into the annulus between the casing and the cylindrical bore-wall comprised of earth, stone, sand, and/or other subterranean substances and formations. In normal primary well cementing, a hydraulic cement composition is pumped down through the casing, and then (through e.g. a cement shoe at the bottom of the string of casing) up into the annulus. The cement sets in the annulus, forming an annular sheath which not only physically supports and positions the pipe string in the well-bore, but also bonds the exterior surfaces of the pipe string to the walls of the well-bore, thereby blocking the undesirable migration of fluids along the well-bore. The successful cementing of a well-bore is affected by many factors, including cement setting time.

Cement setting time is affected by many factors, including weight percent of various components in the mixed cement, such as components which speed or slow the setting time. When mixing the cement prior to pumping the cement down-hole, control of the weight percent level of such time-of-set-regulating components in the final cement mix can be critical to the success of the cementing operation. Too much of, e.g. a cement-set accelerator, can result in setting the cement too quickly and not allowing it to completely fill the annulus. Therefore, the cement as-mixed must be provided within specific cement recipe control parameters. The cement is usually mixed in a blender which receives water, dry cement, dry powders, and/or special additives such as cement-set-time accelerants. Such mixing is often done continuously, rather than by batch. In a continuous mixing system, the blender receives the various material inputs and produces a mixed cement output. Sensors might monitor the flow rate of the water, flow rate of the dry and mixed cement, pressure, viscosity, density, and other measured process variables, and this information can be fed to the process control unit which monitors and then makes decisions to control the cement blending process system. For example, the process control unit might seek to maintain the fluid level in the blender at a constant level. Because the pumping of the cement into the annulus can speed-up, slow down, start, and momentarily stop from time to time, the process control unit will need to adjust the material inputs based on the output being sent down-hole to keep the blender level constant. If the level in the blender goes high as sensed and signaled by a fluid level sensor, the process control system can, for example, either momentarily stop or slow the addition of materials into the blender.

In a typical situation, the blender can be sized to hold only about fifteen seconds of mixed cement demand. Thus, if the process control system makes an under-shoot error, or is too slow in responding to a low level measurement signal from the fluid level gauge in the blender, the blender can possibly run empty, and the pump could suck and pump air into the annulus. In another situation in which a low fluid level is sensed, the process control system might over-shoot the addition of a particular component, such as a cement-set accelerant, and seriously jeopardize the success of the cementing operation, because the cement might set-up before the annulus is completely filled. Modern fluid level control systems for the processing industries have been developed to handle many such under-shoot and over-shoot situations. However, most, if not all, have been developed based on the assumption that, for example, the blending process is not moving, or subject to accelerations and decelerations, as will be encountered if the operation is conducted on a ship on a river, lake, sea, or ocean, where it is subject to wave and/or wind actions. So, for example, when a hydrocarbon production maritime service vessel is conducting the cement blending operation, a wave in the ocean will move the ship, and the blender will move with the ship since it is physically attached to the ship, and the fluid in the blender, or in most containers, for that matter, will "slosh". A significant problem then arises, for example, in the cement blending operation, because the fluid level sensor in the blender can sense a low level when in-fact the blender has the correct amount of mixed cement. For example, the mixed cement might slosh such that the side of the blender where a fluid level sensor is located has a low level and the other side has a high level, at least momentarily. As sloshing continues, the level sensor unknowingly continues to send the changing level signal to the control system, which if not corrected, will begin to make under-shoot and over-shoot errors.

A conventional approach is to average the fluid level signal over some period of time. However, in the case of ocean swells, for example, the time between swells can easily be fifteen to sixty seconds. Thus, if an averaging process control approach is used based on a sixty second running average to "damp" the effect of the ocean swells, the process control system would be tuned so "slowly" as to miss any "true" or actual fluid level deviations caused by process upsets or changes, since, for example, the blender may hold only fifteen seconds of mixed cement. In this instance, "true" or "actual" is used to mean that the level deviation is due to the process and not due to sloshing caused by accelerations of the container. Thus, averaging, damping, or lagging the control system to account for slow-moving ocean swells is not a completely adequate solution to the problem.

Note that a maritime ship, vessel, or apparatus can move in six ways. In this instance, "maritime" refers to waterborne operations conducted on either fresh or salt-water. See FIG. 1A for a depiction of each movement of, for example, a ship 100 with a partially filled container of fluid 100A on it. The ship, and thus the container, can surge (e.g. 104 front to back shifting), heave (e.g. 101 up and down "bobbing"), sway (e.g. 106 side to side shifting), pitch (e.g. 103 front to back rocking), roll (e.g. 102 side to side rolling), and yaw (e.g. 109 rotating about a vertical axis). Each movement can also have a different amplitude, velocity, period, and acceleration or deceleration. For example, rolling of ships up to 30 degrees can occur, and accelerations can approach 0.5 to 1 g. Note that, of course, the motions can be random, variable, or periodic. Because these motions will also affect, for example, the sensed level of fluid in, for example container 100A, the motions can "confuse" a conventional fluid level control system.

Note that other fluid processing operations utilizing fluid level control are also commonly carried-out on-board maritime ships, vessels, or apparatuses, including subterranean reservoir fracturing fluid preparation and well drilling mud operations, as well as simply holding such fluids in tanks, vessels, accumulators, silos, or other such containers. Note also that such ships can vary in size and operate in waters of various degrees of movement. These factors also present the control system with differing and complex control problems.

Control systems to account for the motion of physical objects such as tall buildings in the wind or in an earthquake can use a combination of motion sensors and heavy movable weights. For example, as a building begins to sway in one direction, the motion sensor senses the sway and a process control unit sends a signal to a device to move a heavy weight in an opposite direction in an attempt to counter-act the wind or quake force, and thereby reduce the sway. This technique is commonly referred to as "active motion compensation". One might envision that such a system could be applied to a maritime vessel to stop the six degrees of motion of the vessel itself. However, the size and complexity of the weights or compensating mechanical devices to correct for not just sway, but for the other five motions, represent significant engineering and other kinds of challenges.

One might also envision active motion compensation practiced on the fluid container itself, where the container 100A would be placed on a device or equipped with devices to practice active motion compensation. Again, the size and weight of such containers present engineering and other challenges to account for all six motions. Additionally, the pipes, feeders, pumps, mixers, and other equipment attached to the container or blenders would need to somehow be flexibly connected to the container being moved in response to active motion compensation, which will present additional engineering and other challenges.

Additional information related to compensating for noise in fluid height measurements in containers can be found in U.S. patent application Ser. No. 11/029,072, entitled "Methods and Systems for Estimating a Nominal Height or Quantity of a Fluid in a Mixing Tank While Reducing Noise," filed on Jan. 4, 2005, which is incorporated by reference herein in its entirety.

Thus, solving the problem of reliably controlling processes involving fluid level control in containers subjected to externally-excited motions presents challenges, and requires solutions not adequately met by current approaches, and it remains a particular problem in off-shore equipment operations. Finally, there is an increasing need for reduction of uncertainty in the production of petroleum as the value of petroleum continues to rise.

Process Control Architecture with Hydrodynamic Correction

The present Application discloses new architectures for processes which involve fluid level determination in environments which can be subject to externally-excited motion. Movement of a container can cause fluid therein to slosh, and this can confuse simple measurements of the height of the fluid in the container. The present Application teaches that a hydrodynamic model of in-container fluid motion can be used to remove this source of uncertainty. This architecture can be advantageously implemented in or applied to a wide variety of conventional process control architectures, to improve the fluid amount estimations which would otherwise have been used.

In some embodiments (but not necessarily all), the disclosed ideas are used to control equipment operations conducted on-board water-borne apparatus and particularly for mixing operations performed on-board maritime oilfield service vessels.

In some embodiments (but not necessarily all), the disclosed ideas are used to enable process control of systems experiencing variable, periodic, or random accelerating and decelerating movements.

In some embodiments (but not necessarily all), acceleration inputs are used to provide multi-axis spatial movement measurements of the container and/or the fluid.

In some embodiments (but not necessarily all), neural networks or non-linear learning processes can be used to build the hydrodynamic model of the container and fluid.

The disclosed innovations, in various embodiments, provide one or more of at least the following advantages:

- Improved process control and operation
- Improved unit operations control and performance
- Improved control and performance of mixing operations
- Improved measurement accuracy and reduced measurement uncertainty
- Improved measurements of fluid levels in containers when the fluid is sloshing in the container

BRIEF DESCRIPTION OF THE DRAWINGS

The disclosed innovations will be described with reference to the accompanying drawings, which show important sample embodiments of the invention and which are incorporated in the specification hereof by reference.

FIG. 2 shows one embodiment of an off-shore hydrocarbon well site with various maritime vessels that can experience externally-excited motion, in which some or all of the present innovations can be applied to.

FIG. 3 shows one embodiment of a blending process that can be practiced on-board maritime vessels, to which some or all of the present innovations can be applied to.

FIG. 5 is a state block diagram showing a preferred embodiment of the present innovations of a process control system and method which can be a component in a larger process control system for controlling processes.

DETAILED DESCRIPTION OF THE PREFERRED EMBODIMENTS

The numerous innovative teachings of the present Application will be described with particular reference to the presently preferred embodiment (by way of example, and not of limitation).

Physical System and Model

Figure 1A:
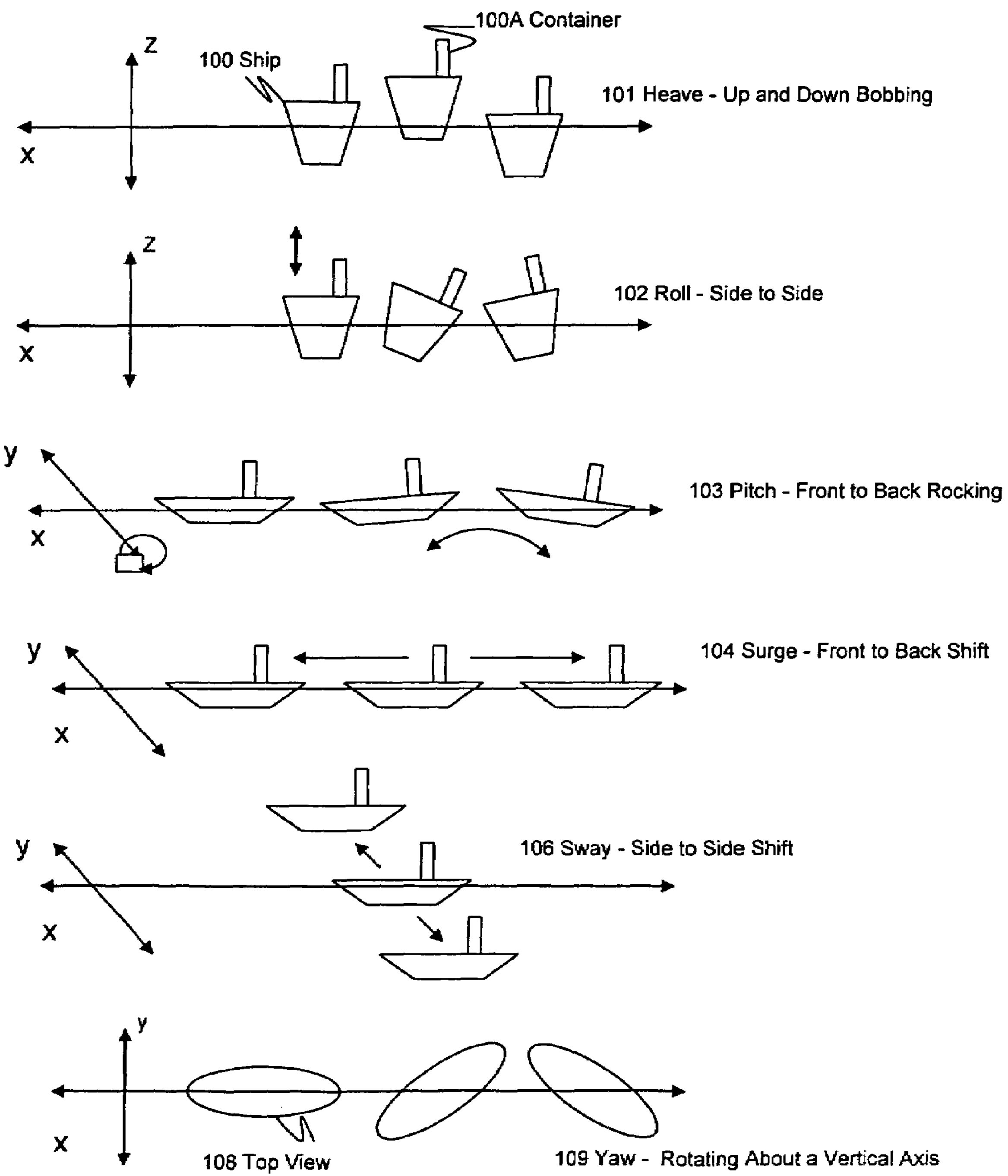
FIG. 1A shows possible motions of a maritime vessel due to sea-state.
Figure 2:
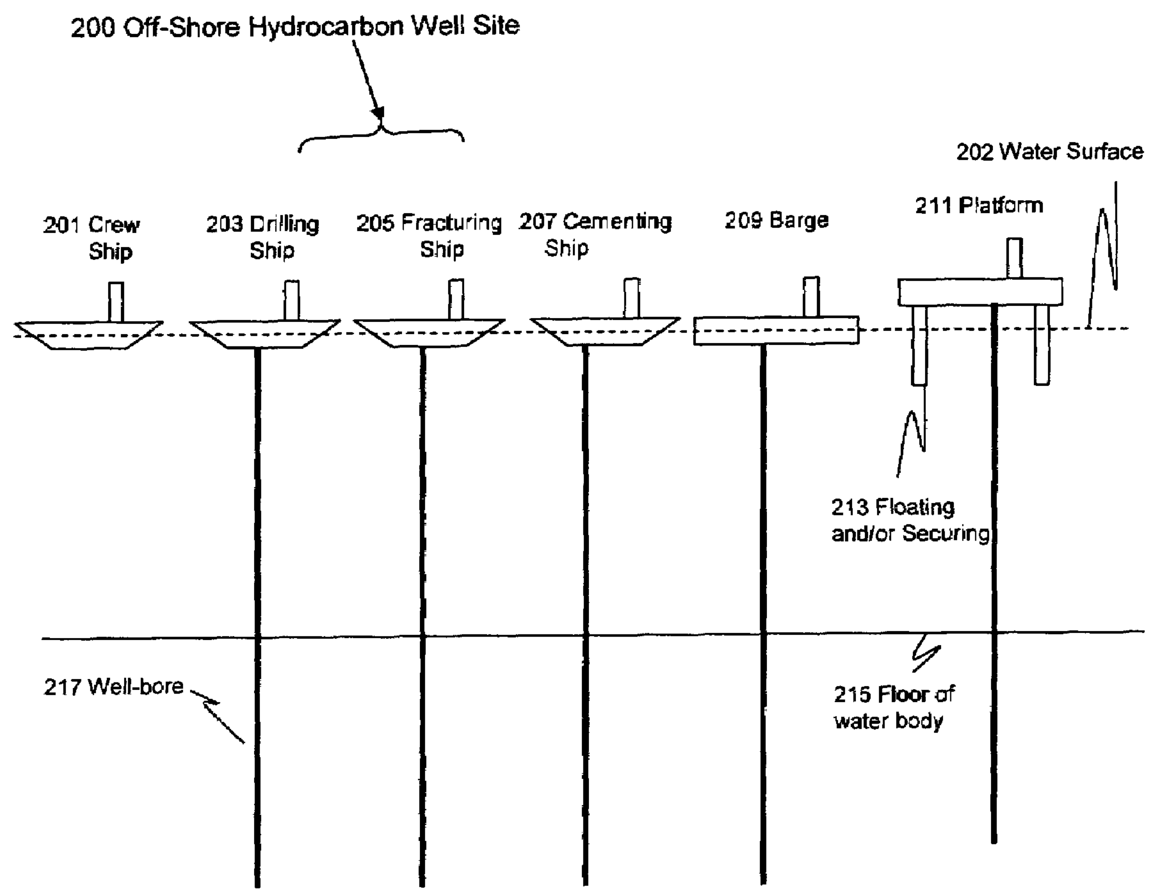

FIG. 2 shows a non-limiting embodiment of some possible components of an exemplary off-shore hydrocarbon well site 200 to which the present innovations can be applied. On the surface of the water, many different components are possible. In one embodiment of the present innovations, a crew ship 201 can be present. In one embodiment of the present innovations, drilling ship 203 can be present and such a ship has a drilling mud preparation processing operation on-board to which some or all of the present innovations can be applied. In one embodiment of the present innovations, fracturing ship 205 can be present and has a fracturing fluid preparation processing operation to which some or all of the present innovations can be applied. In one embodiment of the present innovations, cementing ship 207 can be present and has a cement mixing processing operation, as previously generally described, to which some or all of the present innovations can be applied. In one embodiment of the present innovations, a barge 209 can be present which can contain one or more processing operations to which some or all of the present innovations can be applied. The barge can also be subject to experiencing some or all of the motions of FIG. 1A. In one embodiment of the present innovations, a platform 211 can be present which can contain one or more processing operations to which some or all of the present innovations can be applied. A floating or securing means 213 is shown. Platform 211 can still be subject to experiencing some or all of the motions depicted in FIG. 1A, even though said securing means is present. In one embodiment of the present innovations, one or more processing operations can be conducted on the same ship. An exemplary well-bore 217 is depicted beneath the floor 215 of the water body. In one embodiment of the present innovations, combinations of the various service ships can be present at the well site.

Figure 3:
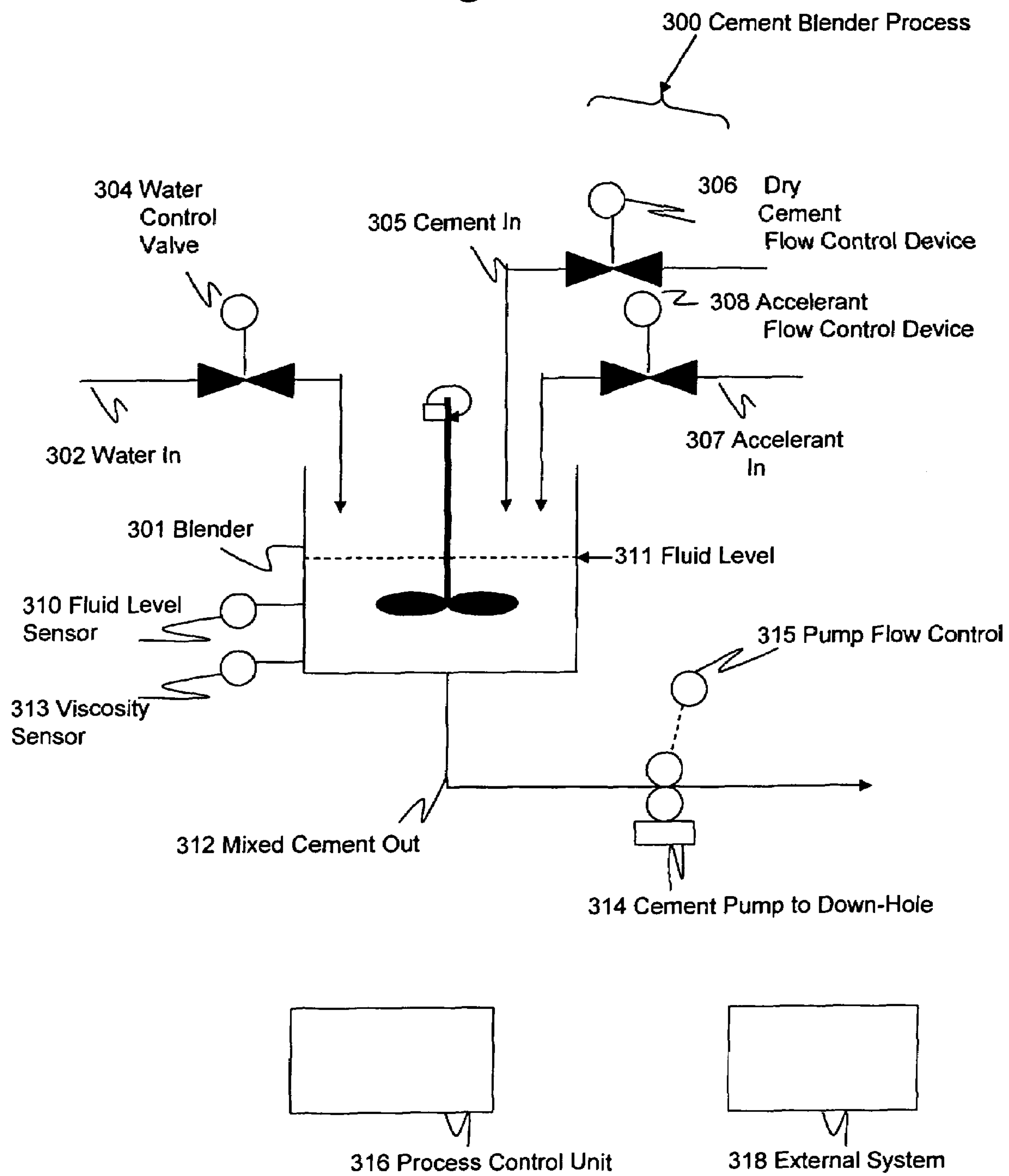

FIG. 3 shows a non-limiting example of a cement blending process 300 as one example of a physical process to which the present innovations can be applied to, or embodied in. Blender 301 can be a blender with a mixer to stir the water, cement, and e.g. an accelerant. Water can enter via flow stream 302 and can be controlled by process control unit 316 via water control valve 304. Dry cement can enter via flow stream 305 and can be controlled by process control unit 316 via cement flow control device 306. Cement-setting accelerant can enter via flow stream 307 and can be controlled by process control unit 316 via accelerant flow control device 308. The fluid level 311 in blender 301 can be sensed by sensor 310. Mixed cement can exit the blender via flow stream 312 and can be pumped down-hole by pump 314. Pump 314 can be controlled by process control unit 316 via pump flow control device 315. Process control unit 316, in one embodiment, can communicate with external system 318. External system 318 can, in one embodiment, perform a wide variety of operations and functions, including interacting with the operation and control functions of process control unit 316.

Figure 1:
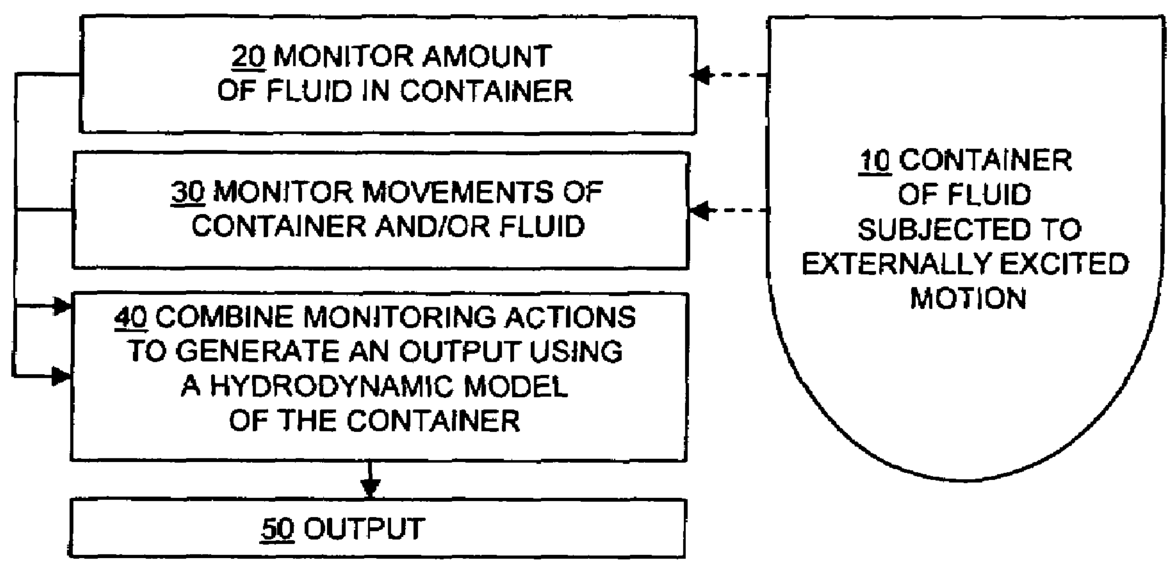
FIG. 1 shows one embodiment of the present innovations.

FIG. 1 shows one embodiment of the present innovations in which a container of fluid 10 is subjected to externally excited motions, such as the motions experienced on-board a water-borne vessel experiencing different sea-states as shown in FIG. 1A. In one embodiment, container 10 can be blender 301 in FIG. 3. The amount of fluid in the container can be monitored by action 20. In one embodiment, the amount can be monitored by measuring the fluid level in container 10. The movement of the container of fluids can be monitored by action 30. In one embodiment, the movement of the container can be monitored by measuring the acceleration of the container using a multi-axis accelerometer, or combination of accelerometers. The results of actions 20 and 30 can be combined using a hydrodynamic model of the container to generate a resultant output in action 40. In one embodiment, the resultant output can be a refined measurement of the actual fluid level in the container. The resultant output can be outputted in action 50. In one embodiment, the output is a control signal that is further processed.

In one embodiment of the present innovations, the hydrodynamic model provides a calculation of the true vertical height of a fluid at a particular point or points in the container, at a particular time in the history of a container of fluid subject to externally-excited motions. The model can receive one or more measured variables, such as the measured vertical height of the sloshing fluid, accelerations of the container, and viscosity of the fluid, and then calculate one or more intermediate variables, and/or calculate and output one or more outputs, such as a calculation of the true height of the level of fluid in the container by removing the momentary fluid height effects due to the aforementioned sloshing.

Figure 4:
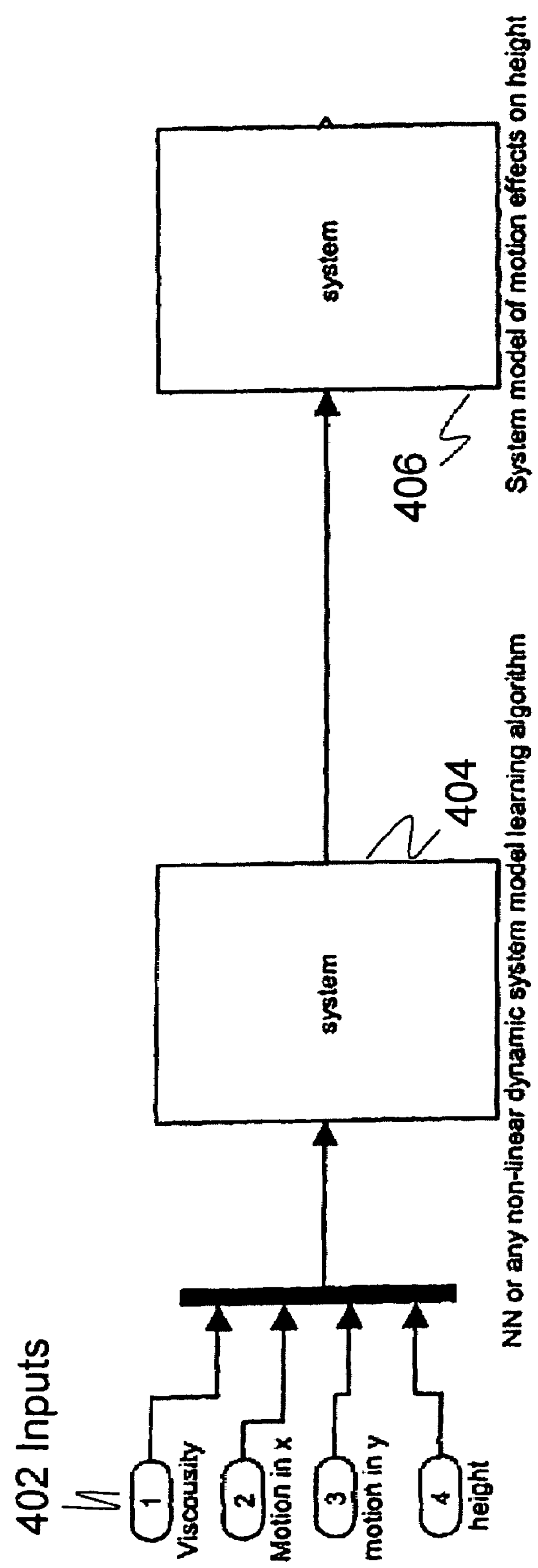
FIG. 4 is a state block diagram showing one embodiment of a process control modeling and training system and method of the present innovations for controlling processes.

FIG. 4 shows a state block diagram of one embodiment of the present innovations. As a non-limiting example of one embodiment of the present innovations, the application of the state block diagram of FIG. 4 will be discussed in reference to the physical mixing system embodied in FIG. 3. One skilled in the art with the benefit of the present Application will realize other kinds of physical systems to which the present innovations can be applied to, or embodied in.

To build a hydrodynamic model of blender 301, four inputs 402-1, 2, 3, and 4 can be inputted to a neural network ("NN") or any non-linear dynamic system model learning algorithm (system 404). In one embodiment, the learning system can receive a real-time measurement of the viscosity of the fluid in blender 301 (e.g. input 402-1). In one embodiment, the learning system can receive motion sensing inputs along two axes (e.g. inputs 402-2 and 402-3). In one embodiment, the learning system can receive an input of a vertical height measurement of the fluid in blender 301 (e.g. input 4). The output of system 404 can be a system 406 comprising a trained or learned system model of the effects of externally-excited motion on fluid level in blender 301.

In one embodiment, FIG. 4 can represent a training system for algorithm 404. The system of 406 can be a trained algorithm. For example, blender 301 can be filled half-way with a model fluid of a known rheology, including a known viscosity. Blender 301, being on-board, for example, ship 207, can experience the motions of FIG. 1A. In training mode, the actual cement mixing process, for example, might not be operating. Instead, the motion in both axes would occur and the sensed height in the container would vary as the model fluid sloshed within blender 301. The learning algorithm 404 can learn through neural network techniques or any non-linear modeling techniques the relationship between the motion represented by inputs 2 and 3, and the sensed level, input 4. In learning, for example, viscosity can be varied by changing fluids and repeating the learning process. Or, the viscosity of the model fluid can be varied randomly in some way to present the algorithm with opportunities to learn the effects of dynamic viscosity behavior in combination with the aforementioned motions. Or, the container can be filled to various levels and the learning process repeated such that the algorithm learns sloshing dynamics as affected by the true height of fluid in blender 301. Other learning methods are also possible as would be appreciated by one skilled in the art of non-linear modeling.

FIG. 5 is a preferred embodiment of the present innovations that, in one embodiment, can be used in a larger process control system for controlling processes. In FIG. 5, the trained system model 406 of FIG. 4 can be adapted and utilized for a motion filtering or canceling function in system hydrodynamic correction block 512 to effect "hydrodynamic correction."

As a non-limiting example of one embodiment of the present innovations, the application of the system and method of FIG. 5 will be discussed in reference to the physical mixing system embodied in FIG. 3. One skilled in the art with the benefit of the present application will realize other kinds of physical systems to which the present innovations can be applied to, or embodied in.

In the operation of the system and method of FIG. 5 during control of the exemplary blending operations, it can receive a sensed or measured vertical fluid height input 502 as a measured process variable of the fluid level of a container, such as blender 301 as sensed by sensor 310. Measured fluid height 502 can be, during sea-board operation, "truly" rising and falling due to real process effects such as changes in demand from pump 314, or from changes in inputted material volumes in streams 302, 305, and/or 307, as previously described. However, measured fluid height 502 can be "falsely" rising and falling due to sloshing caused by the sea-state motions of FIG. 1A. Thus, a first step in FIG. 5 can be to perform a hydrodynamic correction function 516 on the sensed fluid height measurement 502 to remove the "false" rising and falling from the measurement.

In one embodiment, the hydrodynamic correction function 516 can include a summation block 511, a controller 510 with a control function, one or more acceleration measurements, e.g. acceleration along an x-axis 504, and e.g. acceleration along a y-axis 506, a fluid viscosity measurement 508, and a trained system hydrodynamic model 406 as part of hydrodynamic correction block 512. In one embodiment, controller 510 can be a PID (proportional-integral-derivative) controller. In one embodiment, acceleration measurements 504 and 506 can be made by a multi-axis accelerometer. In one embodiment, viscosity measurement 508 can be made by a viscometer.

Sensed fluid height measurement 502, which includes effects of sloshing, can be positively fed to the hydrodynamic correction function 516 via summation block 511. Control signal 514 can be negatively fed to summation block 511. The output of block summation 511 is signal 511A as can be inputted to controller 510. Control signal 511A can be considered as an error function, $\epsilon_{error}$, also referred to as e(t). The error function can be calculated as the difference between a measured variable, such as sensed fluid height 502 in one embodiment, and an estimated variable, such as signal 514, which in one embodiment can represent an estimate of the height of the fluid in blender 301 with the effects of sloshing removed.

Thus, control signal 511A can be a first estimation of the height error, which can then be used to drive the estimation of the fluid height without the effects of sloshing through the use of controller 510 and correction block 512. In a preferred embodiment, controller 510 is a PID controller, which has controller constants $K_P$, $K_D$, and $K_I$, which are the controller gain constants for the proportional, derivative, and integral functions, respectively.

The temporal response of a PID controller can be given by Equation 1:

$$u(t)=K_P e(t)+K_D(de/dt)+K_I\int e(t)dt \tag{1}$$

where e(t) is the error function.

The temporal response of a PID controller can be also transformed into the frequency domain through the use of a Laplace transform. The Laplace transform of the temporal response of a PID controller can be given by Equation 2:

$$U(s)=(K_P+K_D s+(K_I/s))\times E(s) \tag{2}$$

By adjusting or tuning the PID controller constants appropriately as known to one skilled in the art, noise and oscillations can be removed from the fluid height estimation while tracking the nominal value of the fluid height in the container, with the effects of sloshing on the fluid height removed.

The fluid height error function can thus be processed through controller 510 to output control signal 510A to input into hydrodynamic correction block 512.

In one embodiment, acceleration inputs for two axes, x via 504 and y via 506, can be inputted to correction block 512 as they are measured, along with the cement viscosity measurement 508 from sensor 313.

In another embodiment, acceleration inputs for three axes can be used, where a third axis, z, has been previously incorporated into hydrodynamic model 406.

In other embodiments, additional acceleration measurements can be used.

Hydrodynamic correction block 512 can feed the inputs into trained hydrodynamic model 406 to calculate the "false" component of the height measurement as caused by the sloshing. Correction block 512 can then filter or cancel the effect of the externally-excited motion from the control signal 510A by subtracting the calculated false height component, resulting in a hydrodynamically-corrected height signal 512A.

In one embodiment, control signal 514 as a control loop can be closed around the sensed fluid height 502 and control signal 512A. To that effect, control signal 512A can be fed-back as control signal 514 and can be negatively summed in summation block 511, as previously described.

A next step in FIG. 5 can be to further process control signal 512A in a closed loop observer 530, which acts as a dynamic model of the physical mixing process to further correct the control signal, and estimated fluid height, to remove the effects of true volume changes in the blender 301, caused by the process as well as additional noise and oscillations in the associated signals.

The physical system and mass balance of FIG. 3 can be modeled mathematically using the law of mass conservation in a control volume, which can be represented for blender 301 by Equation 3:

$$\rho_w\dot{V}_w+\rho_c\dot{V}_c-\rho_{12}\dot{V}_{12}+\dot{m}_D=\dot{\rho}_{12}h_1A_1+\rho_{12}\dot{h}_1A_1 \tag{3}$$

where $\rho_w$ is the density of water in stream 302, $\rho_c$ is the dry cement density in stream 306, $\rho_{12}$ is the density of the mixed cement exiting blender 301 in stream 312, $A_1$ is the cross-sectional area of blender 301, $h_1$ is the fluid level in blender 301 as measured by fluid level sensor 310, $\dot{h}_1$ is the change in height level per unit time in blender 301, $\dot{V}_w$ is the volumetric flow rate of the water in stream 302, $\dot{V}_c$ is the volumetric flow rate of cement in stream 305, $\dot{V}_{12}$ is the volumetric discharge flow rate of blender 301 as stream 312, and $\dot{\rho}_{12}$ is the change in density of the mixed cement in blender 301 per unit time. The parameter $\dot{m}_D$ represents the sum of all disturbances accounting for unknown mass rate inputs into the system such as the input mass rate of air. The derivation of Equation 3 assumes instantaneous mixing such that any change in the relative proportions of $\dot{V}_w$ and $\dot{V}_c$ is instantaneously realized in the resulting value of the slurry density in blender 301. With this simplification $\rho_{12}$ now represents the density of all the slurry in blender 301 at any given moment.

The physical system and mass balance can also be modeled mathematically by volume conservation assuming that both the water and the cement added to the system are incompressible. This model can be represented for blender 301 by Equation 4:

$$\dot{V}_w+\dot{V}_c-\dot{V}_{12}+\dot{V}_D=\dot{h}_1 A_1 \quad (4)$$

The parameter $\dot{V}_D$ in Equation 4 represents the "volumetric disturbance flow rate," which is herein defined as the sum of the flow rates of inputs, e.g., air, into the mixing process other than the primary materials being mixed. The term $\dot{V}_{12}$, is predominantly a function of $h_1$ as indicated by the following Equation 5:

$$\dot{V}_{12}=F(h_1) \quad (5)$$

Additional information related to physical system dynamic models can be found in U.S. patent application Ser. Nos. 11/323,831 and 11/323,323, both filed on Dec. 30, 2005.

In one embodiment, the closed loop observer as a dynamic model of the physical mixing system and its mass balance can include a summation block 516, a controller 517 with a control function, one or more feed forward input parameters 518, one or more feed forward output parameters 520, a summation block 522 and a container characteristics function 523.

To further refine the estimate of the height of the fluid level in blender 301, hydrodynamically corrected control signal 512A can be positively fed to the dynamic blender model 530 via summation block 516. Control signal 527 can be negatively fed to block 516. The output of block 516 can be signal 516A as input to controller 517. 516A can be considered an error function, $\epsilon_{error}$, also referred to as e(t), as described previously. The error function can be calculated as the difference between a measured variable, such as signal 512A in one embodiment, and an estimated variable, such as signal 527, in one embodiment.

Thus, signal 516A can be another, more refined fluid height error estimation, which can then be used to drive the estimation to the nominal container height through the use of controller 517. In a preferred embodiment, controller 517 is a PID controller, which has controller constants and temporal responses as previously described By adjusting the PID controller constants appropriately as known to one skilled in the art, noise and oscillations can be removed from the container height estimation while tracking the nominal value of the fluid height in the container.

One skilled in the art of process control with the benefit of this disclosure will recognize that the methods, devices, and systems of the present innovations can be applied to digital signals, as well as analog signals. The digital signals can be processed using digital transform functions, including but not limited to, Z transforms, Fast Fourier Transforms, and wavelet transforms.

In other embodiments, the variables can be other physical parameters such as the volume, quantity of fluid, or surface area of the fluid in the container.

In one embodiment, feed forward input parameters 518 can include measured material inputs into, for example, blender 301, such as streams 302, 305, and/or 307.

In one embodiment, feed forward output parameters 520 can include mixed cement output 312 out of, for example, blender 301.

The summation block 522 can be positively fed with the feed forward input parameters 518 and the output of controller 517 as control signal 517A, and can be negatively fed with the feed forward output parameters 520.

The container characteristics function 523 can take into account the dimensions of the container, such as its cross section area. The container characteristics function 523, in one embodiment, can include block 524 which represents the function of the inverse of the container cross sectional area to convert the rate of any change of fluid volume in the container to rate of change of fluid height in the container. Block 526 can be included to effect an integration process with respect to time, converting the rate of change of fluid height in the container to the actual fluid height 528.

It should be noted that the container cross sectional area does not need to be constant. These methods and systems are not affected by changes in the cross section of the container as long as those changes are known a priori.

By addition of a feed forward function to the dynamic model, the performance can be improved, especially when the feed forward is used together with a traditional feedback function. In one embodiment, since sensors can have inaccuracies and noise, control loop 527 can be closed around the hydrodynamically corrected control signal 526A and the actual fluid height 528.

The result can be an output of the true height of the fluid in the container 528, which can now be utilized by process control unit 316 as a reliable measurement of the height of the fluid in the container, essentially free of errors due to externally-excited motion such as depicted in FIG. 1A.

In another embodiment, controllers 510 and/or 517 can be a proportional-integral ("PI") controller.

In another embodiment, controller 510 and/or 517 can be a proportional ("P") controller.

In another embodiment, controller 510 and/or 517 can be a proportional-derivative ("PD") controller.

In another embodiment, controller 510 and/or 517 can be a non-linear controller.

According to a disclosed class of innovative embodiments, there is provided a process control method, comprising the actions of monitoring the amount of a fluid in a container, monitoring movements of said fluid and/or said container, and combining results of said monitoring actions using a hydrodynamic model of said container to generate a resultant output.

According to a disclosed class of innovative embodiments, there is provided a process control method, comprising the actions of measuring the amount of a fluid in a container which is subject to externally-excited motion, measuring a spatial movement parameter of said fluid and/or said container, modifying the result of an amount-measuring action to more closely represent the actual amount of said fluid using said spatial movement measurements as an input to a hydrodynamic model of the behavior of said fluid, and controlling a process using the hydrodynamic model.

According to a disclosed class of innovative embodiments, there is provided a process control system comprising a connection to at least one measured variable input which is related to the amount of fluid in said container, a connection to at least one spatial parameter measurement of said fluid and/or said container, and at least one output, derived from said measured variable input as modified by a hydrodynamic model of fluid motion in said container, which has reduced dependency on the hydrodynamics of motion of the fluid in the container.

According to a disclosed class of innovative embodiments, there is provided a process control system comprising a hydrodynamic model of the level of a fluid within a container subject to externally-excited motion during operation, a system to monitor at least accelerations of said fluid and said container, and a logic circuit which uses at least a first determination of said level and said accelerations to calculate a second determination of said level.

According to a disclosed class of innovative embodiments, there is provided a process control system, comprising means for receiving measurements related to the amount of a fluid in a container, means for monitoring movements of said fluid and/or said container, and means for using said measurements and a hydrodynamic model which simulates said container to generate modified measurements.

According to a disclosed class of innovative embodiments, there is provided a mixing process system comprising a mixing process or equipment subjected to externally-excited motions wherein said mixing process or equipment receives at least one input fluid flow stream and has at least one output fluid flow stream and a process control system acting on said mixing process or equipment wherein said control system reduces the effect of said motions on the results of the mixing process.

Modifications and Variations

As will be recognized by those skilled in the art, the innovative concepts described in the present Application can be modified and varied over a range of applications, and accordingly the scope of patented subject matter is not limited by any of the specific exemplary teachings given. It is intended to embrace all such alternatives, modifications and variations that fall within the spirit and broad scope of the appended claims.

The methods and systems of the present Application can operate across a wide range of processing situations and conditions. One of ordinary skill in the art, with the benefit of this disclosure, will recognize the appropriate use of the methods and systems for a chosen application of a given or dynamic set of operating parameters, including process pressure, process temperature, process flow rate, fluid composition, flow stream composition, presence of gases, use of flow stream conditioning operations, flow stream pipe locations for sensors, slip-stream installation of measurement devices versus full-stream installation versus insertion installation, ambient temperature, or other conditions.

Optionally, the methods and systems of the present Application can be configured or combined in various schemes. The combination or configuration depends partially on the required measuring precision and accuracy and the operational envelope of the process. One of ordinary skill in the art, with the benefit of this disclosure, will recognize the appropriate combination or configuration for a chosen application.

Optionally, the methods and systems of the present application can also measure the density of the fluid whose level is being controlled.

Optionally, flags such as a particular process variable out of range which can define the reliability of the data or provide variables to use for process control. One of ordinary skill in the art, with the benefit of this disclosure, will recognize the appropriate additional measurements that would be beneficial for a chosen application. Optionally, such measurements taken by the methods and systems of the present Application can also be sent to the external system 318 for processing or use. For example, if the fluid level exceeds a certain amount, this fact could be used to flag improper data during a system upset. Fluid viscosity having a large standard deviation beyond a preset level might be used for the same flagging determination.

Optionally, fluid viscosity or rheologic property temperature compensation can be employed used to adjust for shifts in temperature using reference data sets relating temperature change to total fluid viscosity change, or curves fitted to such reference data.

Optionally, because the viscosity changes of different fluid compositions or recipes can vary from application to application, or across different embodiments, different reference data sets or curves or hydrodynamic models fitted to such data sets can be employed, maintained, or stored in unit 316 or external system 318. One of ordinary skill in the art, with the benefit of this disclosure, will recognize the appropriate systems to employ for such temperature compensation methods.

Optionally, blenders of various types can be used including propeller, ribbon, paddle, baffle, tumble, turbine, helical, jet, eduction, etc. as known to a person having ordinary skill in the art of blending.

Optionally, containers of various types can be used including pressure vessels, vacuum vessels, vertical vessels, horizontal vessels, open tanks, closed tanks, cone tanks, cone-bottom tanks, etc. as known to a person having ordinary skill in the art of process vessel selection or design.

Optionally, the methods and systems of the present innovations can be applied to a plurality of containers in series or parallel.

Optionally, the methods and systems of the present innovations can be applied to containers having a fluid which contains desirable additives which modify the fluid's rheologic properties.

Optionally, the methods and systems of the present innovations can be applied wherein the nominal quantity of a fluid in a container is estimated.

Optionally, fluid level measurements of height, amount, weight, load cell force, or physical fluid level gauging can be employed.

Optionally, position, velocity, and force can be employed, along with acceleration for motion sensing.

Optionally, the methods of the present application can also be embodied in a set of instructions that can be used on a general purpose desktop or laptop computer or microprocessor system, or external system 318. The set of instructions can comprise input instructions that receives data from unit 316. Similarly, the input instructions can accept instructions from a user via one or more input devices, such as a keyboard, mouse, touchpad, or other input device. The instructions can also implement the methods of the present innovations or any part thereof to generate, for example, an updated transform for the system model 512 and closed loop observer 530. The instructions can cause the computer or microprocessor system to display information, such as the results of the methods of the present innovations, to a user, through a display monitor, printer, generated electronic file, or other such device. The instructions can also cause the computer or microprocessor system to transmit the results to a distant user via modem, cable, satellite, cell link, or other such means. For such digital communications, RS-422 or RS-485 can optionally be used to allow links from unit 316 or external system 318 to multiple external units or locations. Optionally, a 4-20 milliamp analog output signal can be used to allow external processing of the system measurements.

Optionally, the methods of the present invention can also be embodied in a computer readable medium.

The preferred embodiment uses fluid level sensing. Various technologies can be used to sense the fluid level, including differential pressure sensors, capacitance probes, sonar probes, radar probes, and mechanical level devices such as floats or the like.

In some embodiments (but not necessarily all), the hydrodynamic model can incorporate fluid movements caused by mixing processes.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A process control system controlling fluid in a container, comprising:

an interface connecting to at least one measured variable input from a sensor related to the amount of fluid in a container subject to externally-excited motions;

an interface connecting to at least one spatial parameter measurement of the fluid and/or the container; and at least one output, derived from the measured variable input as modified by a hydrodynamic model of fluid motion in the container, which has reduced dependency on the motions of the fluid in the container;

wherein the hydrodynamic model simulates modes and frequencies of the container at different heights of the fluid in the container, and/or different viscosities of the fluid.

2. The system of claim 1 wherein the container is mounted on a waterborne apparatus.

3. The system of claim 1 wherein the fluid in the container is water, an aqueous solution, an aqueous slurry, a mixture of cement and water, or a mixture of cement and an aqueous solution.

4. The system of claim 1 wherein the measured variables are selected from the group consisting of the fluid's level in the container, the fluid's mass in the container, the fluid's weight in the container, the fluid's volume in the container, static force exerted by the fluid, down-force exerted by the fluid, and the fluid's height at a particular point or points in the container.

5. The system of claim 1 wherein the spatial parameter measurements are selected from the group consisting of accelerations in one or more axes of direction, velocities in one or more axes of directions, or position in one or more axes.

6. The system of claim 1 wherein inputs to the hydrodynamic model include two or more inputs selected from the group consisting of accelerations in two or more axes, velocity in two or more axes, position in two or more axes, the fluid's viscosity, dynamic measurements of the fluid's viscosity, the fluid's density, dynamic measurements of the fluid's density, the fluid's yield value, the fluid's gel strength, the fluid's temperature, amount of water in the fluid, amount of solids in the fluid, amount of cement in the fluid, and amount of air in or entrained in the fluid.

7. The system of claim 1 wherein the output is used to control at least one or more flow streams connected to the container.

8. The system of claim 1 wherein the hydrodynamic model is integrated with a dynamic process system model.

9. The system of claim 1, wherein the hydrodynamic model functions with a dynamic process system model using a closed loop observer that modifies the measured variable related to the amount of the fluid in the container.

10. A process control system, comprising:

a hydrodynamic model of the level of a fluid within a container subject to externally-excited motion;

a system to monitor at least accelerations of the fluid and the container; and a logic circuit which uses at least a first determination of the level and the accelerations to calculate a second determination of the level wherein the hydrodynamic model simulates modes and frequencies of the container at different heights of the fluid in the container, and/or different viscosities of the fluid.

11. The system of claim 10 wherein the container is mounted on a water-borne apparatus.

12. The system of claim 10 wherein inputs to the hydrodynamic model include two or more inputs selected from the group consisting of accelerations in two or more axes, velocity in two or more axes, position in two or more axes, the fluid's viscosity, dynamic measurements of the fluid's viscosity, the fluid's density, dynamic measurements of the fluid's density, the fluid's yield value, the fluid's gel strength, the fluid's temperature, amount of water in the fluid, amount of solids in the fluid, amount of cement in the fluid, and amount of air in or entrained in the fluid.

13. The system of claim 10 wherein the output is used to control at least one or more flow streams connected to the container.

14. The system of claim 10, wherein the hydrodynamic model functions with a dynamic process system model using a closed loop observer that modifies the measured variable related to the amount of the fluid in the container.

15. A process control system, comprising:

means for receiving measurements related to the amount of a fluid in a container;

means for monitoring movements of the fluid and/or the container; and means for using the measurements and a hydrodynamic model which simulates the container to generate modified measurements;

wherein the hydrodynamic model simulates modes and frequencies of the container at different heights of the fluid in the container, and/or different viscosities of the fluid.

16. The process control system of claim 15, wherein the process control system is for hydrocarbon production wherein a container of fluid subjected to externally excited motion.

17. The process control system of claim 15 wherein the fluid in the container is water, an aqueous solution, an aqueous slurry, a mixture of cement and water, or a mixture of cement and an aqueous solution.

18. The process control system of claim 15 wherein the measurements related to the amount of a fluid are selected from the group consisting of the fluid's level in the container, the fluid's mass in the container, the fluid's weight in the container, the fluid's volume in the container, static force exerted by the fluid, down-force exerted by the fluid, and the fluid's height at a particular point or points in the container.

19. The process control system of claim 15 wherein movements of the fluid and/or the container are selected from the group consisting of accelerations in one or more axes of direction, velocities in one or more axes of directions, or position in one or more axes, of the container.

20. A process control system wherein a container of a fluid is subjected to externally excited motion, comprising:

a processor that has a built-in hydrodynamic model for data processing;

at least one first sensor that measures the fluid;

at least one second sensor that measures the movements the container;

wherein said first and second sensors send the measurements to said processor to generate control signals for controlling a production process that the container is designed to do; and wherein the container is a blender in a cement blending system.

21. The process control system of claim 20 wherein the hydrodynamic model is integrated with a dynamic process system model.

22. The process control system of claim 20 wherein the container is mounted on a water-borne apparatus.

23. The process control system of claim 20 wherein the container is mounted on an off-shore maritime vessel.

24. The process control system of claim 20 wherein the container is mounted on an off-shore cementing ship.

* * * * *